(12) United States Patent
Achour (10) Patent No.: US 7,315,744 B2
(45) Date of Patent: Jan. 1, 2008

(54) SYSTEM AND METHOD FOR MINIMIZING HARDWARE AND MAXIMIZING CAPACITY IN A WIRELESS COMMUNICATIONS SYSTEM

(75) Inventor: Baaziz Achour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 09/771,210

(22) Filed: Jan. 24, 2001

(65) Prior Publication Data

US 2002/0137518 A1    Sep. 26, 2002

(51) Int. Cl.
*H04Q 7/20* (2006.01)
*H04Q 7/00* (2006.01)

(52) U.S. Cl. .................. 455/453; 455/436; 455/513; 455/438; 455/439; 370/331; 370/332

(58) Field of Classification Search ............. 455/453, 455/447, 443, 450, 365, 435.3, 438, 439, 455/452.2, 436, 440, 441, 444; 370/320, 370/331

See application file for complete search history.

(56) References Cited

U.S. PATENT DOCUMENTS

| | | | | |
|---|---|---|---|---|
| 5,737,704 A | * | 4/1998 | Jin et al. ..................... | 455/450 |
| 5,781,861 A | * | 7/1998 | Kang et al. ................. | 455/442 |
| 5,796,722 A | | 8/1998 | Kotzin et al. | |
| 5,826,190 A | * | 10/1998 | Krutz et al. ................ | 455/428 |
| 5,933,777 A | | 8/1999 | Rahman | |
| 6,002,676 A | * | 12/1999 | Fleming ..................... | 370/328 |
| 6,026,301 A | * | 2/2000 | Satarasinghe ............... | 455/436 |
| 6,069,871 A | * | 5/2000 | Sharma et al. ............. | 370/209 |

(Continued)

FOREIGN PATENT DOCUMENTS

EP    1058473    12/2000

(Continued)

*Primary Examiner*—Duc M. Nguyen
*Assistant Examiner*—Huy Phan
(74) *Attorney, Agent, or Firm*—Thomas R. Rouse; Kenyon Jenckes; Eric Ho (57) ABSTRACT

A system for improving the efficiency of a wireless communications network that employs a plurality of frequencies per cell. The system includes a first mechanism that monitors the network load associated with each of the plurality of frequencies and provides corresponding status values in response thereto. A second mechanism compares the status values to predetermined loading criteria and provides an indication in response thereto when one or more of the status values meet the criteria. A third mechanism redistributes the network load in accordance with the indication. In a specific embodiment, the criteria include one or more predetermined thresholds such that when one or more of the predetermined thresholds is surpassed by the one or more of the status values, the criteria are met. The status values are representative of loading conditions for communications system resources associated with each of the frequencies. The loading conditions are representative of currently available resources allocated for each of the plurality of frequencies. Each status value includes a hardware resource component, an air link resource component, and a handling resource component. Each component is indicative of respective remaining resources. The hardware resource component incorporates the number of currently available channel elements for an associated frequency. The air link resource component incorporates transmit power available for a particular frequency. The handling resource component incorporates the number of available Walsh codes for a particular frequency.

32 Claims, 5 Drawing Sheets

U.S. PATENT DOCUMENTS

| | | | |
|---|---|---|---|
| 6,122,513 A * | 9/2000 | Bassirat | 455/443 |
| 6,192,232 B1 * | 2/2001 | Iseyama | 455/404.1 |
| 6,208,860 B1 * | 3/2001 | Kim et al. | 455/440 |
| 6,393,003 B1 * | 5/2002 | Lee | 370/331 |
| 6,490,452 B1 * | 12/2002 | Boscovic et al. | 455/436 |
| 6,549,524 B1 * | 4/2003 | Shin | 370/331 |
| 6,611,506 B1 * | 8/2003 | Huang et al. | 370/329 |
| 2005/0026614 A1 * | 2/2005 | Otsuka et al. | 455/436 |

FOREIGN PATENT DOCUMENTS

| | | |
|---|---|---|
| WO | 9945734 | 9/1999 |

* cited by examiner

SYSTEM AND METHOD FOR MINIMIZING HARDWARE AND MAXIMIZING CAPACITY IN A WIRELESS COMMUNICATIONS SYSTEM

BACKGROUND OF THE INVENTION

1. Field of Invention

This invention relates to wireless communications systems. Specifically, the present invention relates to systems and methods for facilitating load sharing between frequencies in wireless communications networks employing cells with multiple frequencies.

2. Description of the Related Art

Wireless communications systems are employed in a variety of demanding applications including Internet, faxing, and voice communications applications. Such applications require cost-effective, reliable service. As demand for wireless services expands along with new applications, wireless communications systems must adapt to efficiently accommodate increased network usage.

Systems for efficiently handling increased wireless network usage are particularly desirable in new digital wireless communications systems, such as code division multiple access (CDMA) telecommunications systems. A CDMA system often includes a plurality of mobile stations (e.g. cellular telephones, mobile units, wireless telephones, or mobile phones) in communication with one or more base station transceiver subsystems (BTS's). Signals transmitted by the mobile stations are received by a BTS and often relayed to a mobile switching center (MSC) having a base station controller (BSC). The MSC, in turn, routes the signal to a public switched telephone network (PSTN), to a Packet Data Network (PDN)—internet, or to another mobile station via a BTS. Similarly, a signal may be transmitted from the public switched telephone network or PDN to a mobile station via a base station or BTS and an MSC.

Each BTS governs a cell corresponding to a region within which a mobile station may communicate with the BTS. Calls within cells are routed from mobile stations to and from a telecommunications network via an associated BTS and an MSC. The coverage area of a typical cellular telecommunications system is divided into several cells. Different communications resources, such as frequencies, are often allocated to each cell to increase communications system resources. When a mobile station moves from a first cell to a second cell, a handoff is performed to assign new system resources associated with the second cell to the mobile station.

A BTS routes calls between mobile stations within a predetermined geographic area, i.e., cell governed by the BTS, and to and from an MSC and a BSC. The MSC and BSC facilitate the routing of calls between BTS's and between the wireless communications network and the PSTN or internet, which is also called the wireline network or the landline network.

A BSC or MSC is often associated with a particular geographic area comprising one or more cells and often includes various components such as a selector bank subsystem (SBS) and radio link manager (RLM) to facilitate the allocation of network resources between voice or data calls and other network functions. Network resources may include available hardware resources, such as channel elements, handling resources, such as available Walsh codes, and air link resources, such as available transmit power.

Wireless communications systems must efficiently use network resources to accommodate increased network usage. Wireless networks often employ additional frequencies in the system operating frequency band to accommodate additional users. In such systems, each additional frequency is typically accompanied by additional hardware to accommodate users employing the additional frequencies.

When a user turns on a wireless phone operating within the network, the user is assigned to one of the available frequencies in the coverage area in which the user is operating based on a pseudo random function known as a hash function. The hash function is based on a user identification number. Once on a call, the user is assigned to a given frequency, known as the access frequency, the user typically stays assigned to that frequency until the user reaches the boundary of the frequency coverage area, and is handed off to another frequency.

Unfortunately, this method of allocating wireless frequency resources among users does not efficiently account for the movement of users, overlapping frequency coverage areas, nor the position of users within the overall wireless network coverage area. Consequently, some frequencies may become overloaded, resulting in dropped calls, while other available frequencies remain under-utilized. For example, a coverage area associated with a frequency $f_1$ may contain a smaller overlapping coverage area having an additional available frequency $f_2$. When a user is assigned to $f_1$ and moves into the overlapping coverage area where $f_1$ and $f_2$ are available, the user remains assigned to $f_1$ even if $f_1$ is congested relative to $f_2$. When $f_1$ is overloaded, calls are often dropped or blocked to alleviate the overload condition, resulting in reduced service reliability. Alternatively, additional expensive hardware is added to accommodate additional users on $f_1$, while the hardware associated with $f_2$ remains under-utilized. Such load imbalances are undesirable and represent inefficient use of network resources. In addition to reduced network reliability, these load imbalances may result in increased costs as network administrators add expensive hardware to accommodate the additional users.

Hence, a need exists in the art for a system and method that efficiently balances the load between frequencies in a wireless communications network having coverage areas with multiple frequencies, thereby minimizing hardware requirements and maximizing capacity per frequency. There exists a further need for a system that efficiently accounts for the movement of users and the position of users relative to overlapping frequency coverage areas and facilitates the sharing of hardware resources across frequencies.

SUMMARY OF THE INVENTION

The need in the art is addressed by the system for improving the efficiency of a wireless communications network of the present invention. In the illustrative embodiment, the inventive system is adapted for use a wireless communications system employing a plurality of frequencies per cell. The system includes a first mechanism for monitoring network load associated with each of the plurality of frequencies and providing corresponding status values in response thereto. A second mechanism compares the status values to predetermined criteria and provides an indication in response thereto when one or more of the status values meet the criteria. A third mechanism redistributes the network load in accordance with the indication.

In a specific embodiment, the criteria include one or more predetermined thresholds such that when one or more of the predetermined thresholds is surpassed by one or more of the status values, the criteria are met. The status values are representative of loading conditions for communications system resources associated with each of the frequencies of a given sector of a cell. The loading conditions are representative of currently available resources allocated for each of the plurality of frequencies in a given sector of a BTS. Each status value includes a hardware resource component, an air link resource component, and a handling resource component. Each component is indicative of respective remaining resources. The hardware resource component incorporates the number of currently available channel elements for an associated frequency. The air link resource component incorporates transmit power available for a particular frequency of a sector before it reaches its maximum air link capacity. The handling resource component incorporates the number of available Walsh codes for a particular frequency.

In the illustrative embodiment, the first mechanism includes sector frequency controllers, one for each of the plurality of frequencies in a sector. Each sector frequency controller communicates with a corresponding call resource manager. The call resource manager is positioned on a base station transceiver subsystem. The second mechanism includes software running on each of the sector frequency controllers. The software generates a status value associated with a corresponding frequency, compares the status value to one of the predetermined thresholds, and generates a status message in response thereto. The status message specifies that either the corresponding frequency is available; that the corresponding frequency is available for handoff only; that the corresponding frequency is available for emergency calls only; or that the corresponding frequency is unavailable. The indication provided by the second mechanism incorporates the status message when the status message specifies that the corresponding frequency is available for handoff only, for emergency calls only, or is otherwise unavailable.

The third mechanism includes a load-balancing broker that receives the indication. The load-balancing broker communicates with a pilot database and selector elements. The selector elements are positioned on a base station controller and are in communication with channel elements of a base station transceiver subsystem associated with the cell and the corresponding frequency. The load-balancing broker includes a mechanism for finding mobile stations that are not currently undergoing handoff, that are operating within a predetermined restricted region about the base station transceiver subsystem, and that are associated with frequencies specified via the indication. Mobile stations operating within a restricted region have round trip delays (RTD's) less than a configurable round trip delay threshold. Upon finding these mobile stations and available target frequencies, the load-balancing broker issues a load shed request to the selector elements that are handling calls to these mobile stations.

The selector elements include a mechanism for implementing handoff of a mobile station from a first frequency to a target frequency in accordance with load-balancing handoff criteria. The selector elements include a mechanism for providing a load shed response to the load-balancing broker in response to the receipt of the load shed request. The load shed response indicates if the mobile stations were successfully handed off, via the mechanism for implementing handoff, to available frequencies specified in the load shed request. The load-balancing handoff criteria or criterion specifies that handoff is only allowed from the first frequency to a target frequency having a higher frequency availability value than the first frequency and when the target frequency is within the same sector as the first frequency. The handoff criteria or criterion gives preference to target frequencies with higher frequency availability values. A pilot database is employed to help determine frequency availability values and specifies overlying frequencies (vertical neighbors of a sector plus frequency) and neighboring frequencies (neighbors in adjacent sectors plus frequencies) associated with each frequency of a given sector.

The novel design of the present invention is facilitated by the third mechanism that redistributes network resources from frequencies that are having loading problems to frequencies that are not having loading problems. By effectively balancing loads between frequencies, the present invention increases communications system efficiency by reducing call blocking, handoff blocking and call dropping probabilities and reducing hardware required to maintain these probabilities within acceptable limits.

The novel design of the present invention is further facilitated via the use of the round trip delay between the mobile stations and the serving base station transceiver subsystem. The round trip delay provides an estimate of the location (on a circle around the BTS) of a mobile station with respect to the organization of frequency coverage areas within the system. Accordingly, only mobile stations not near the boundaries of certain coverage areas are handed off to other frequencies. Consequently, the mobile stations are unlikely to subsequently require hard handoff to neighboring frequencies due to mobile station movement. Furthermore, if mobile stations are near an edge of coverage, handoff for load balancing purposes might not be successful. This scenario, i.e., the handing off of mobile stations near frequency coverage area boundaries for load balancing purposes, is largely avoided by the present invention. Since close to the center of a cell, frequencies of the cell overlap, selecting mobile stations within a predetermined range about the center of the cell helps to minimize subsequent hard handoffs.

Furthermore, by employing a new vertical neighbor field in a pilot database to facilitate the determination of frequency availability values for each frequency, further network efficiency is achieved. A frequency availability value for a particular frequency in a given sector is inversely related to the number of vertical and horizontal neighboring frequencies. Use of frequency availability values facilitates discriminating between neighboring target frequencies so that the number of subsequent hard handoffs is further minimized. This further maximizes the use of system resources.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
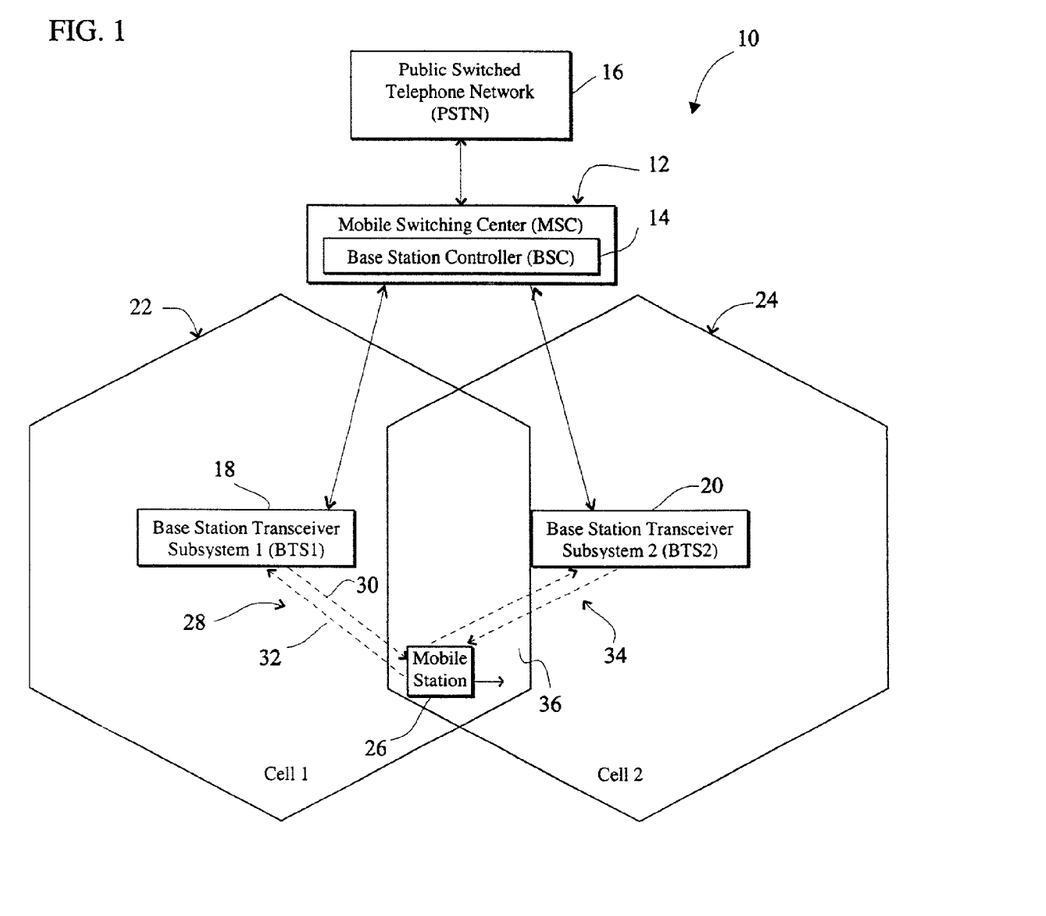
FIG. 1 is a block diagram of an exemplary code division multiple access (CDMA) wireless communications system for which the present invention is adapted.

FIG. 1 is a block diagram of an exemplary wireless communications system 10 for which the present invention is adapted. The system 10 includes a mobile switching center (MSC) 12 having a base station controller (BSC) 14. A public switched telephone network (PSTN) 16 routes calls from telephone lines and other networks and communications devices (not shown) to and from the MSC 12. The MSC 12 routes calls from the PSTN 16 to and from a first BTS 18 and a second BTS 20 associated with a first cell 22 and a second cell 24, respectively. The BTS's 18 and 20 are often called cell controllers.

The MSC 12 routes calls between the BTS's 18 and 20. The first BTS 18 directs calls to the first mobile station 26 within the first cell 22 via a first communications link 28. The communications link 28 is a two-way link having a forward link 30 and a reverse link 32. Typically, when the BTS 18 has established communications with the mobile station 26, the link 28 is characterized as a traffic channel. While only two BTS's 18 and 20 are shown in FIG. 1, more BTS's or fewer BTS's may be employed without departing from the scope of the present invention.

The first BTS 18 and the second BTS 20 are positioned near the centers of the corresponding cells 22 and 24, respectively. In the present specific embodiment, the BTS's 22 and 24 employ more than one frequency, i.e., cellular communications frequency band, to accommodate additional traffic within the cells 22 and 24. The frequencies (frequency coverage areas) overlap, as discussed more fully below, and are approximately centered about each BTS 18 and 20.

When the mobile station 26 moves from the first cell 22 to the second cell 24, the mobile station 26 is handed off to the second BTS 20. Handoff typically occurs in an overlap region 36 where the first cell 22 overlaps the second cell 24.

In a soft handoff, the mobile station 26 establishes a second communications link 34 with the target BTS 20 in addition to the first communications link 28 with the source BTS 18. During a soft handoff where the mobile station 26 stays on the same frequency, both the first link 28 and the second link 34 are maintained simultaneously. After the mobile station 26 has crossed into the second cell 24, it may drop the first communications link 28. Examples of soft handoff are illustrated in U.S. Pat. No. 5,101,501, issued Mar. 31, 1992, entitled "SOFT HANDOFF IN A CDMA CELLULAR TELEPHONE SYSTEM" assigned to the assignee of the present invention and incorporated by reference herein.

In a hard handoff where the mobile station 26 changes frequency, the communications link 34 is not established. When the mobile station 26 moves from the first cell 22 to the second cell 24, the link 28 to the source BTS 18 is dropped and a new link is formed with the target BTS 20. When cells have little or no overlap, hard handoff is often performed to assign the new resources of the target BTS 20 to the mobile station 26.

A handoff involves the execution of a set of negotiation instructions between the mobile station 26 and one or more governing BTS's and/or MSC's, such as the BTS's 18 and 20 and the MSC 12. To facilitate hard handoff between adjacent cells, a handoff beacon (not shown) is often employed. A beacon in each cell broadcasts a signal having a limited range about the cell. When a mobile station in a first cell detects a beacon from a second cell, the telephone is hard handed off to the second cell.

When a mobile station, maintaining a call, travels from a first system coverage area associated with a first BSC (or BTS) to a second system coverage area associated with a second BSC (or BTS), the mobile station is handed off to the second BSC (or BTS) and associated BTS(s). If the target BTS associated with the second BSC (or BTS) has insufficient traffic channels to accommodate the hard handoff, the handoff is typically blocked by a call resource manager (CRM) of the target BTS, and the call quality is degraded leading to a possible call drop. Hence, when all traffic channels in a BTS are in use, any additional calls denied hard hand off to the BTS are typically degraded and eventually dropped, and any newly originated calls are typically blocked.

The present invention accounts for several types of call origination and handoff including intersystem handoff and intrasystem handoff. An intersystem handoff occurs when a mobile station operating under the control of a given cellular telecommunications system, such as the system 10, moves outside the coverage area of the telecommunications system and is handed off to an adjacent system (not shown). Intersystem handoff is used when two telecommunication systems are adjacent to one another or are overlapping and the neighboring system is better able to serve the mobile station 26 than the current serving system 10. The neighboring system and the serving system 10 must have contiguous serving areas. Intersystem handoff can take place between two systems using the same air interface or between two systems using two different air interfaces.

Intrasystem handoff occurs when a mobile station moves from one cell (BTS) coverage area to another cell coverage area. Intrasystem handoff can be either a soft handoff when the anchor and target cells operate on the same frequency or a hard handoff when the cells have different frequencies. Intrasystem hard handoff is often employed in systems having multiple frequencies assigned to some BTS's to efficiently utilize spectrum resources while maximizing the capacity of the CDMA network. Using multiple frequencies often provides advantages over other methods aimed at capacity increase such as cell splitting or cell sectorization. Intrasystem hard handoff can also happen between two networks of the same system using two different air interfaces.

In multiple frequency systems, hard handoff is often required when a mobile is moving from an area that has multiple frequencies to an area that has different frequencies or same but fewer frequencies. Hard handoff is also often required when a mobile station moves from an area with small load on the serving frequency to an area with high load on the serving frequency and load balancing in accordance with the present invention is required.

Figure 2:
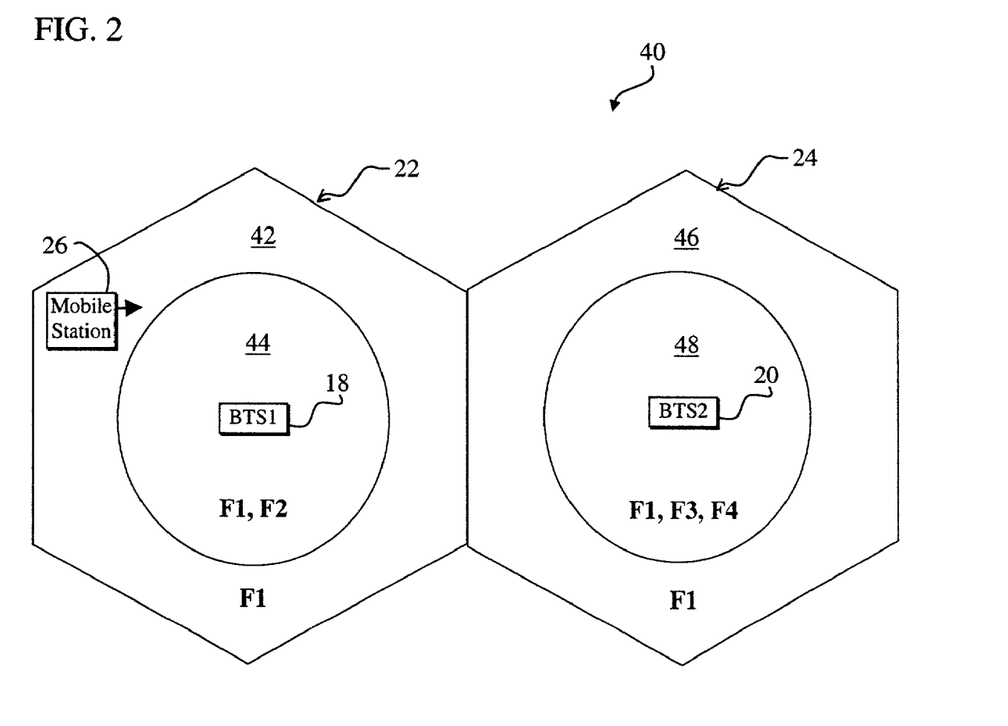
FIG. 2 is a diagram showing an exemplary coverage area of the wireless communications system of FIG. 1 showing multi-frequency coverage areas.

FIG. 2 is a diagram showing an exemplary coverage area 40 of the wireless communications system 10 of FIG. 1 employing multiple frequencies. The coverage area 40 is a sector that includes the first cell 22 and the second cell 24.

The first cell 22 has a first frequency coverage area (F1) 42 that covers the entire cell 22. A first inner overlapping coverage area (F1, F2) 44 is centered within the first frequency coverage area 42 and includes overlapping frequencies F1 and F2, i.e., the frequency coverage area F2 overlaps the frequency coverage area F1.

Similarly, the second cell 24 has a second frequency coverage area (F1) 46 that covers the entire second cell 24. A second inner overlapping coverage area (F1, F3, F4) 48 includes overlapping frequencies F1, F3, and F4. The cells 22 and 24 include the corresponding BTS's 18 and 20, respectively, centered within the corresponding cells 22 and 24. The BTS's 18 and 20 facilitate communications with mobile stations, such as the mobile station 26, on the frequencies F1, F2, F3 and/or F4.

In conventional systems, when a mobile station, such as the mobile station 26, operating within the first frequency coverage area (F1) 42 of the first cell 22 moves into the first inner overlapping coverage area (F2) 44 of the first cell 22, the mobile station continues operating on the frequency F1 even if F1 is overloaded and F2 has ample remaining capacity. When F1 becomes overloaded, existing calls, i.e., communications links between a mobile station and the cell 22, may be dropped, and any new calls or hand off requests may be blocked. This increases the call dropping and blocking probabilities of the communications system. Conventionally, to reduce the call blocking and dropping probabilities to acceptable levels, additional expensive hardware resources, such as channel elements, are added to the associated BTS 18 to accommodate additional traffic. This represents inefficient use of network resources.

In accordance with the present invention, each BTS 18 and 20, as discussed more fully below, employs position information (on a circle around the BTS) pertaining to the location of mobile stations within each cell 22, and 24 to facilitate load balancing and associated handoff between frequencies in accordance with the current load handled by each frequency. In the present embodiment, each BTS 18 and 20 measures the round trip delay (RTD) for each mobile station operating within the exemplary coverage area 40. The RTD represents the time required for a signal to travel from the governing BTS to the associated mobile station and back to the BTS. The distance between the mobile station and the BTS is determined based on the RTD and the speed of light. Hence, when mobile stations are within the first overlapping frequency coverage area 44, for example, the RTD's of the associated mobile stations will be less than a certain RTD value. When the load associated with F1 reaches a certain predetermined load threshold, then mobile station operating within the first overlapping coverage area 44, as indicated by the RTD's of the mobile stations, are handed off via hard handoff to frequency F2 assuming the load on F2 has not reached a similar load threshold. The load thresholds are application-specific and may be dynamically updated based on network conditions.

When mobile stations operating on frequency F2 within the first overlapping coverage area 44 move out side the overlapping coverage area 44 to the first coverage area (F1) 42 where F2 is not available, the mobile stations are hard handed off to frequency F1. The load-balancing system of the present invention, as discussed more fully below, ensures that sufficient capacity is available on F1 to accommodate hard handoffs from F2 to F1, by keeping the load on F1 below a predetermined load threshold. To minimize subsequent hard handoffs from F2 to F1, hard handoffs from F1 to F2 for load balancing purposes are only allowed for mobile stations within a predetermined range about the BTS 18 as indicated by RTD's below a predetermined threshold. The predetermined range may be smaller than the first inner overlapping coverage area 44.

When the mobile station 26 travels from the first frequency coverage area (F1) 42 of the first cell 22 to the second frequency coverage area (F1) 46 of the second cell 24, the mobile station continues to operate on F1. When the mobile station 26 transitions from the second frequency coverage area (F1) 46 to the second inner overlapping coverage area 48 and is within a given RTD of the BTS 20, and the load on the frequency F1 surpasses a given load threshold, the mobile station 26 is handed off to either frequency F3 or frequency F4 assuming the loads on F3 and F4 are below corresponding predetermined load thresholds. The decision to handoff the mobile station 26 to F3 or F4 is based partially on frequency availability values (FAV's) constructed in accordance with the teachings of the present invention and assigned to each frequency F1, F2, F3, and F4.

The FAV value for a particular frequency is based on a vertical neighbor record and a horizontal neighbor record in a pilot database as discussed more fully below. The unique vertical neighbor record specifies, for each frequency of a sector, frequencies that overlap that frequency in that sector. For example, in cell 48, F1 includes overlapping frequencies F3 and F4, which would be specified in a vertical neighbor field of a vertical neighbor record of the pilot database. Similarly, in cell 44, F2 includes the overlapping frequency F1, which would be specified in the associated vertical neighbor field. The horizontal neighbor record lists neighboring frequencies in adjacent sectors for each frequency of a given sector. Frequencies of sectors with larger numbers of horizontal and vertical neighbors, as indicated via the corresponding horizontal and vertical neighbor fields, respectively, in the pilot database are assigned lower FAV values as discussed more fully below.

When deciding to handoff the mobile station 26 to either F3 or F4 in the second inner overlapping coverage area 48, the frequency with the largest FAV is given preference. Typically, frequencies having smaller ranges about the BTS 20 have higher FAV values. Consequently, the present invention keeps the load on the frequencies with most neighbors below certain load thresholds and moves mobile stations that are unlikely to require further handoff (RTD<RTD threshold) to frequencies with fewer neighbors. This helps minimize requisite hard handoffs and maximize the use of network resources.

Close to the center of a cell, frequency coverage areas overlap. Consequently, by employing RTD to estimate the location of mobile stations with respect to frequency coverage areas within system coverage area 40, mobile stations furthest from frequency coverage boundaries (RTD<RTD threshold) are handed off for load balancing purposes. This minimizes the likelihood that the mobile stations will subsequently require hard handoff due to mobile station movement. By minimizing hard handoffs, the present invention achieves further hardware efficiency. Furthermore, by ensuring that mobile stations undergoing handoff for load balancing purposes are not near frequency coverage area boundaries, such handoff is less likely to interfere with other types of handoff and visa versa.

A wireless network becomes overloaded when the number of calls routed through the network becomes sufficiently large to significantly degrade the performance of the network. The exact parameters for determining when a network is overloaded vary from system to system. By comparing available network resources, such as air link resources, hardware resources, and handling resources with appropriate thresholds set relative to network capacity limits, rules for determining when a given network is overloaded for the purposes of the present invention are easily established, as discussed more fully below.

The load on a given frequency, such as F1, varies in accordance with the number of active mobile stations, i.e., users employing the resources of F1. The load on the frequency F1 may increase or decrease depending on the number of users entering or exiting F1, such as via handoff or via mobile station new call setup. Such handoffs include soft/softer handoffs and hard handoffs triggered by user mobility (such as between boundaries of adjacent CDMA systems) and hard handoff due to load balancing across frequencies initiated via the present invention.

Figure 3:
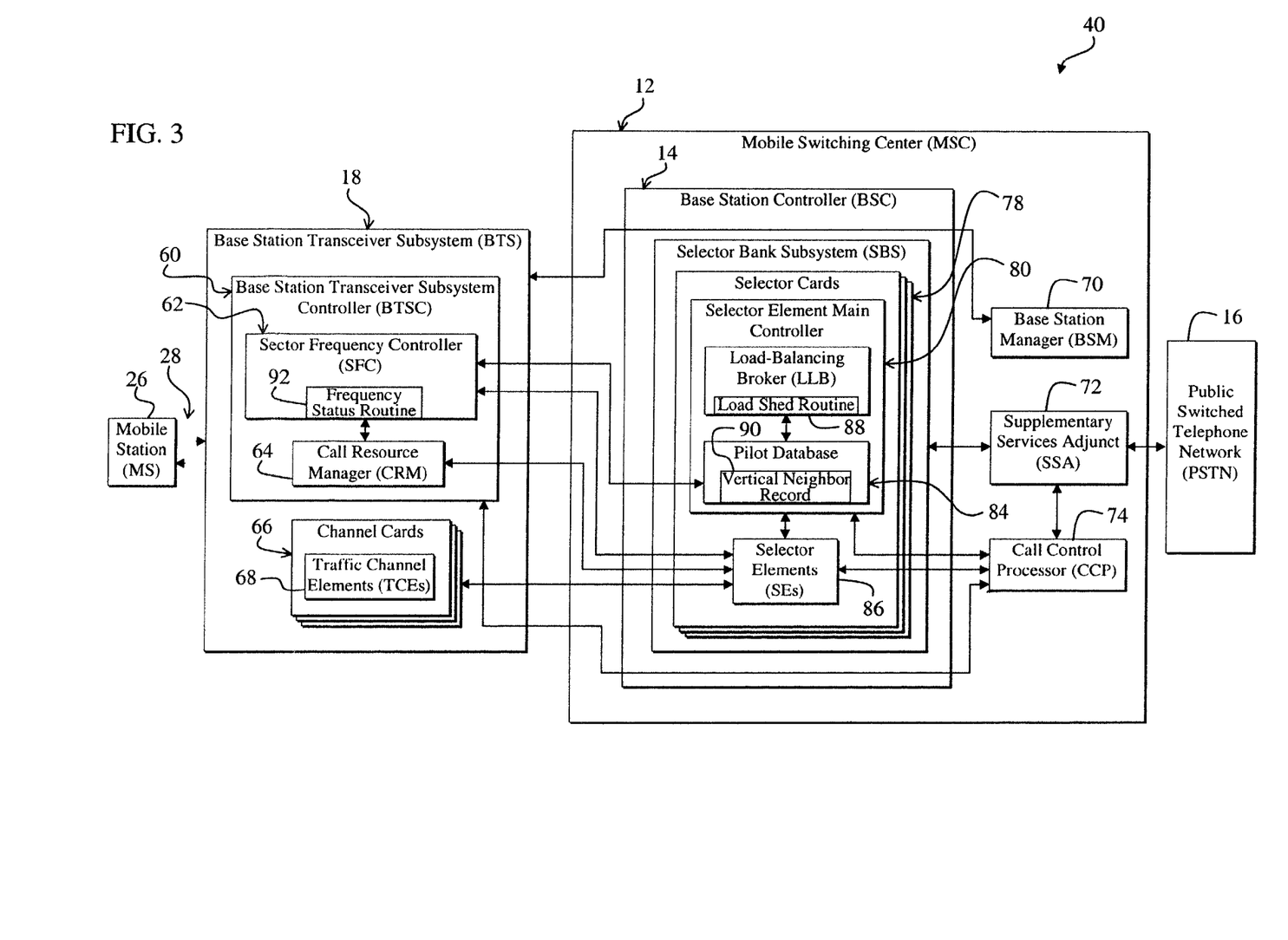
FIG. 3 is a more detailed diagram of the wireless communications system of FIG. 1 showing the mobile switching center (MSC), the base station controller (BSC), the first base station transceiver subsystem (BTS), and the mobile station of FIG. 1.

FIG. 3 is a more detailed diagram showing the mobile switching center (MSC) 12, the base station controller (BSC) 14, the first base station (BTS) 18, and the mobile station 26 of FIG. 1.

For clarity, the second base station 20 of FIG. 1 is omitted from FIG. 2. In addition, various other system components are omitted, such as overhead channel managers, radio link managers, paging and access managers, call manager transaction processors, and other hardware and/or software modules. However, those skilled in the art will know where to obtain or how to build these components and how they fit within the system 10. For example, well known components, such as a cell site modem in the BTS 18 for establishing the air-interface link 28 between the base station 18 and the mobile station 26 and a code division multiple access (CDMA) interconnect subsystem for routing messages from various elements within the base station 18 to various elements within the BSC 14 and MSC 12 are omitted.

The BTS 18 includes a base station transceiver subsystem controller (BTSC) 60 having a sector frequency controller 62 in communication with a call resource manager 64. The BTS 18 also includes a plurality of channel cards 66. Each channel card 66 has traffic channel elements 68. Other interconnections between the various modules 60, 62, 64, 66, and 68 of the BTS 18 are not shown so as to more clearly illustrate the present invention. The mobile station 26 is shown communicating with the BTS 18 via the air interface link 28.

The MSC 12, which communicates with the PSTN 16, includes a base station manager (BSM) 70, a supplementary services adjunct (SSA) 72, a call control processor (CCP) 74, and the BSC 14. The BSC 14 includes a selector bank subsystem (SBS) 76 having a plurality of selector cards 78. The selector cards 78 include a selector element main controller 80, which acts as a computer that runs unique software of the present invention for implementing a unique load-balancing broker (LLB) 82 and pilot database 84 which intercommunicate. The selector cards 78 also include selector elements 86 that are in communication with the selector element main controller 80.

The BSM 70 of the MSC 12 is connected to the BTS 18 and may communicate with other modules of the MSC 12 and the BSC 14 via various interconnections (not shown). The BSM 70 is a computer that is often employed to perform diagnostic tests on the system 10 and upload software and parameters, such as software constructed in accordance with the teachings of the present invention, to and from various components of the system 10.

Although other interconnections (not shown) between various modules of the MSC 12 exist, the following discussion of interconnections between modules of the system 10 is intended to more clearly illustrate the present invention. The SSA 72 is shown connected to the SBS 76 of the BSC 14, to the CCP 74 of the MSC 12, and to the PSTN 16. The CCP 74 is connected to the SE's 86 of the Selector cards 78, to the BTSC 60 of the BTS 18, to the selector element main controller 80, and to the SSA 72. The SE's 86 are connected to the selector element main controller 80 and are in communication with the LLB 82 and pilot database 84 of the selector element main controller 80. In addition, the SE's 86 are connected to the CCP 74, to the channel cards 66 and communicate with the associated TCE's 68, to the CRM 64 of the BTSC 60, and to the SFC 62 of the BTSC 60. The pilot database 84 is in communication with the LLB 82 and the SFC controller 62. The LLB 82 is in communication with the pilot database 84.

In accordance with the present invention, the LLB 82 includes a unique load shed routine 88. The pilot database 84 includes a novel vertical neighbor record 90 in addition to frequency preference tables, accompanying frequency status records, and frequency availability records (not shown) for each BTS (BTS 18) governed by the BSC 14. The SFC 62 of the BTSC 60 on the BTS 18 includes a frequency status routine 92 and other software or hardware routines (not shown) for tracking the status of each frequency employed by each sector of the BTS 18 as indicated by the associated CRM 64. The TCE's 68 on the channel cards 66 include functionality (not shown) for performing round trip delay (RTD) calculations for each mobile station (mobile station 26) governed by the BTS 18.

In operation, the BTS 18 maintains communications links with a plurality of mobile stations, such as the communications link 28 with mobile station 26. The communications links are assigned different resources associated with different frequencies, such as frequencies F1 or F2. The resources include air link resources, such as available transmit power, hardware resources, such as available TCE's 68, and handling resources, such as available Walsh codes. The BTS 18 routes the calls between mobile stations or between mobile stations and other communications devices (not shown) connected to the PSTN 16. The CRM 64 manages the various resources assigned to mobile stations in communication with the BTS 18. The CRM 64 provides resource information, such as the traffic channel elements 68 currently in use for each frequency. The SFC 62 receives the resource information and generates a frequency status value (SF_CRMStatus) for each frequency of a given sector in the BTS. Each frequency status value is indicative of the current load, i.e., amount of traffic currently supported by each frequency of a sector.

In the present specific embodiment, frequencies of a sector are assigned status values of either 0, 1, 2, or 3. 0 is assigned to frequencies that are unavailable, which may be due to hardware failure, administrative maintenance, or other issues. 1 is assigned to frequencies that are slightly more available than those with a status of 0. Frequencies with a 1 status are available for emergency calls only. 2 is assigned to frequencies that are slightly more available than those with a status of 1 and are available for handoff and emergency calls only. 3 is assigned to frequencies that are generally available for all types of uses, including standard data, fax, and voice calls.

The frequency status routine 92 compares the load on each frequency to a load threshold. When the load on a particular frequency with a status of 3 exceeds the threshold, the status of the frequency is changed to either 0, 1, or 2, depending upon the amount by which the threshold is exceeded. The corresponding frequency status (0, 1, or 2) is forwarded to the pilot database 90, where the new status is recorded for that particular frequency on that particular sector.

The frequency status information in the pilot database 84 is available to the LLB 82 and accompanying load shed routine 88. Once a frequency of a sector is set to a status of 0, 1, or 2, i.e., is not completely available, the LLB 82 queries the SE's 86 for information pertaining to mobile stations, currently on a call on this frequency, that meet certain load shedding criteria. The query is sent via a RequestForLoadSheddingReport message from the LLB 82 to the SE's 86. The SE's 86 respond with a LoadShedReport message detailing which mobile stations meet the load shedding criteria.

The frequency status information in the pilot database 84 is also available to the SE's 86, which include a controller (not shown) for running software for improving selector element functionality. A mobile station status routine (not shown) running on the controller in the SE's 86 retrieves information pertaining to each frequency that is not completely available, i.e., has a status other than 3. The retrieved information includes frequency availability values (FAV's) retrieved from the pilot database 84, round trip delay (RTD) values retrieved from the TCE's 68, and pilot signals in the active set for each mobile station. If a mobile station has more than one pilot signal in the active set, then the mobile station is undergoing handoff.

The LLB 82 is notified of mobile stations that meet predetermined load shedding criteria based on the retrieved values. The notification is sent to the LLB 82 in a LoadShedReport message, as discussed more fully below.

In the present embodiment, to meet the predetermined load shedding criteria, a mobile station must be serviced by a frequency with a status (SF_CRMStatus) not equal to 3; have a single pilot in the active set (is not in soft or softer handoff); and have a RTD that is less than a configurable RTD threshold. Mobile stations that meet the above criteria are reported to the LLB 82 via the LoadShedReport message.

Upon receipt of the LoadShedReport message, the LLB 82 determines available candidate frequencies to move mobile stations that meet the load shedding criteria. Candidate frequencies have SF_RMStatus values of 3, and preference is given to frequencies with the highest FAV, i.e., is surrounded by the least number of neighboring sectors with the same frequency, which tends to encompass the smallest region with the same frequency about the associated BTS, such as the BTS 18. The vertical neighbor record 90 facilitates the determination of the FAV's by providing information about vertical neighbors of each frequency. A first frequency is a vertical neighbor of a second frequency if it overlaps the second frequency.

When candidate frequencies are determined via the LLB 82, the LLB 82 issues a LoadShedRequest message to the SE's 86 detailing which mobile stations to handoff to which available frequencies.

Subsequently, the SE's 86 initiate the handoffs specified in the LoadShedRequest message and subsequently respond to the LLB 82 with the status of the handoffs in a LoadShedResponse message. Consequently, system load is distributed across frequencies, and any one frequency is less likely to become overloaded to the point where calls are dropped or blocked.

The exact criteria for determining when a frequency is overloaded for load balancing purposes of the present invention are application-specific and may be altered to meet the needs of a given application by one skilled in the art without departing from the scope of the present invention.

Those skilled in the art will appreciate that the single load threshold employed by the frequency status routine 92 may be replaced by a plurality of load thresholds, one for each type of frequency resource, without departing from the scope of the present invention. In addition, rather than employing a threshold that must be exceeded by a load, one may employ a resource threshold below which available resources must drop to trigger the reassignment of an available status value to a lessor status value without departing from the scope of the present invention.

The frequency status routine 92 and load shed routine 88 are implemented in software in the present embodiment, however those skilled in the art will appreciate that the routines 88 and 92 may be implemented in hardware without departing from the scope of the present invention.

With access to the present teachings, one skilled in the art can easily implement the appropriate code to construct the various requisite messages, such as LoadShedReport messages and LoadShedResponse messages and other functionality necessary to implement the present invention.

The novel design of the present invention is enhanced by the use of the FAV values of the present invention. FAV values facilitate the ranking of frequencies from best to worst, in terms of the number of neighbors for a given sector. For example, if M frequencies with traffic channels exist within a given cell neighborhood, the best frequency (shared by most neighbors) has a FAV of 1. The worst frequency (shared by least number of neighbors) has an FAV of M.

When frequencies have similar availability, similar FAV values are assigned to these frequencies via the BSM 70. Hence, when all frequencies have similar system footprints (exactly overlaid on top of each other), the same FAV of 1 is assigned to all sector frequencies.

The BSM 70 obtains FAV information from a network planning tool. Network planning tools are known in the art and may be easily adapted to collect FAV values in accordance with the teachings of the present invention.

The best frequency in a given sector is not necessarily the best frequency in another sector. If certain frequencies are given similar ranks (similar FAV's), then the immediately following rank numbers are skipped to guarantee that the rank of the worst frequency is equal to the number of frequencies in the sector. For instance, assuming three frequencies are offered by a given sector, if two of the frequencies have rank 1 (FAV=1) then rank 2 is skipped and the next available rank is 3 (the last frequency has FAV=3).

Initial traffic channel assignment, in accordance with the present invention, should result in the system load being concentrated on the best frequency (Primary frequency). Spillover load is assigned to the next best frequency (e.g. Secondary frequency) and so on until the frequency with the highest FAV (smallest coverage in vicinity of mobile's sector) is used. Traffic channel assignment routines to achieve the above results may be developed by one skilled in the art with access to the present teachings.

Each SFC 62 continuously monitors the load on an associated frequency of a sector and reports the status of the frequency to the BSC 14. The reporting occurs upon a change in frequency status (SF_CRMStatus). Each SFC, including SFC 60 and other SFC's (not shown) in the system 10 shall broadcast changes in frequency status to the BSC 14. The frequency status is specified via the new parameter SF_CRMStatus. As mentioned above, the SF_CRMStatus parameter is set to one of the following: 3=frequency available, 2=frequency available for handoff and emergency calls only, 1=frequency available for emergency calls only, and 0=SF unavailable. If SF_CRMStatus=3, then the corresponding frequency is available for new calls, handoff, and emergency calls. If a SF_CRMStatus=2, then the corresponding frequency is available for handoff and emergency calls only. If SF_CRMStatus=1, then the corresponding frequency is available for emergency calls only. Finally, if SF_CRMStatus=0 then the corresponding frequency is not available for service. The pilot database 84 updates the status of each frequency of a given sector upon reception of the broadcast status from the corresponding SFC 62.

The system of the present invention for facilitating load sharing between frequencies is adapted for use with a unique call origination algorithm discussed below. At call origination, the SBS 76 selects a sector and frequency and requests an air link resource from its CRM 64 based on the FAV value of the frequency and the FAV values of vertical neighbors in the vertical neighbor record 90; a list of pilot signals reported by the mobile station 26 (Each pilot signal is associated with a sector frequency); the SF_CRMStatus of the frequency and SF_CRMStatus of vertical neighbors of the frequency (Vertical neighbors are specified in the new vertical neighbor record 90 of the pilot database 84); and the RTD of the mobile station 26 to the BTS associated with the sector frequency that handled the origination or page response.

The SBS 76 only requests resources from CRM 64 of SFC's having an available resource status, i.e., SF_CRMStatus=3. The SBS 76 requests a resource from the CRM 64 of the call-originating BTS 18 (or page response) given that the RTD, as measured via the TCE's 68, is below some configurable threshold. For origination purposes, if the RTD is above the configurable threshold, the SBS 76 requests an air link resource from the CRM 64 of the BTS 18 associated with the better frequency (minimum FAV) if any. The RTD component of the present call origination algorithm may be disabled by setting the RTD threshold to some arbitrary large number. When all frequencies have the same footprint (i.e. access frequency has FAV=1), the assigned frequency defaults to the access frequency. The SBS 76 selects a frequency with the lowest possible FAV for mobiles outside the core area of coverage (RTD exceeding threshold).

The SBS 76 selects the access frequency for mobiles inside the core area of coverage (RTD below threshold). When the sector frequency is unavailable, the SBS 76 selects an available frequency with the worst possible FAV (least number of neighbors) for mobile stations inside the core area of coverage (RTD below threshold). Each TCE 68 maintains an estimate of the RTD for every call in progress. The RTD estimates the distance between a mobile station 26 in a call and the cell serving site (BTS 18). This RTD information is sent to the selector element 86 involved in the call whenever the change from last reported RTD value exceeds a certain value. When the mobile station 26 reports more than one pilot signal in its request (IS-95B compatible mobile), the SBS 76 requests resources from at most three corresponding sectors with the same frequency.

The SBS 76 selects the best three sectors with the same frequency in accordance with the Handoff Granting Algorithm (HGA). The HGA itself is known in the art and defined in IS-95B, but its use for call setup is new. In conventional systems, the HGA is typically only employed for soft handoff of mobile stations already on a call.

Since there is no active set yet upon call setup, the SBS 76 assumes that the best pilot signal (with highest Ec/Io (chip energy to interference ratio)) is the only active set pilot and then runs the next best pilot through the HGA to determine if the next pilot signal should be added to the active set. If the next pilot should be added, then the next best pilot with two pilots in the active set is analyzed and so on. If a given pilot signal fails to pass the HGA test, all remaining pilot signals (with lower Ec/Io) reported in the access message (Origination or Page Response) are dropped.

Software for implementing the above call origination algorithm may be developed and positioned in appropriate modules of the system 10 by those ordinarily skilled in the art with access to the present teachings. In addition, systems for measuring and computing RTD values for mobile stations via functionality built into the TCE's 68 is known in the art and may be adapted for use with the present invention.

Figure 4:
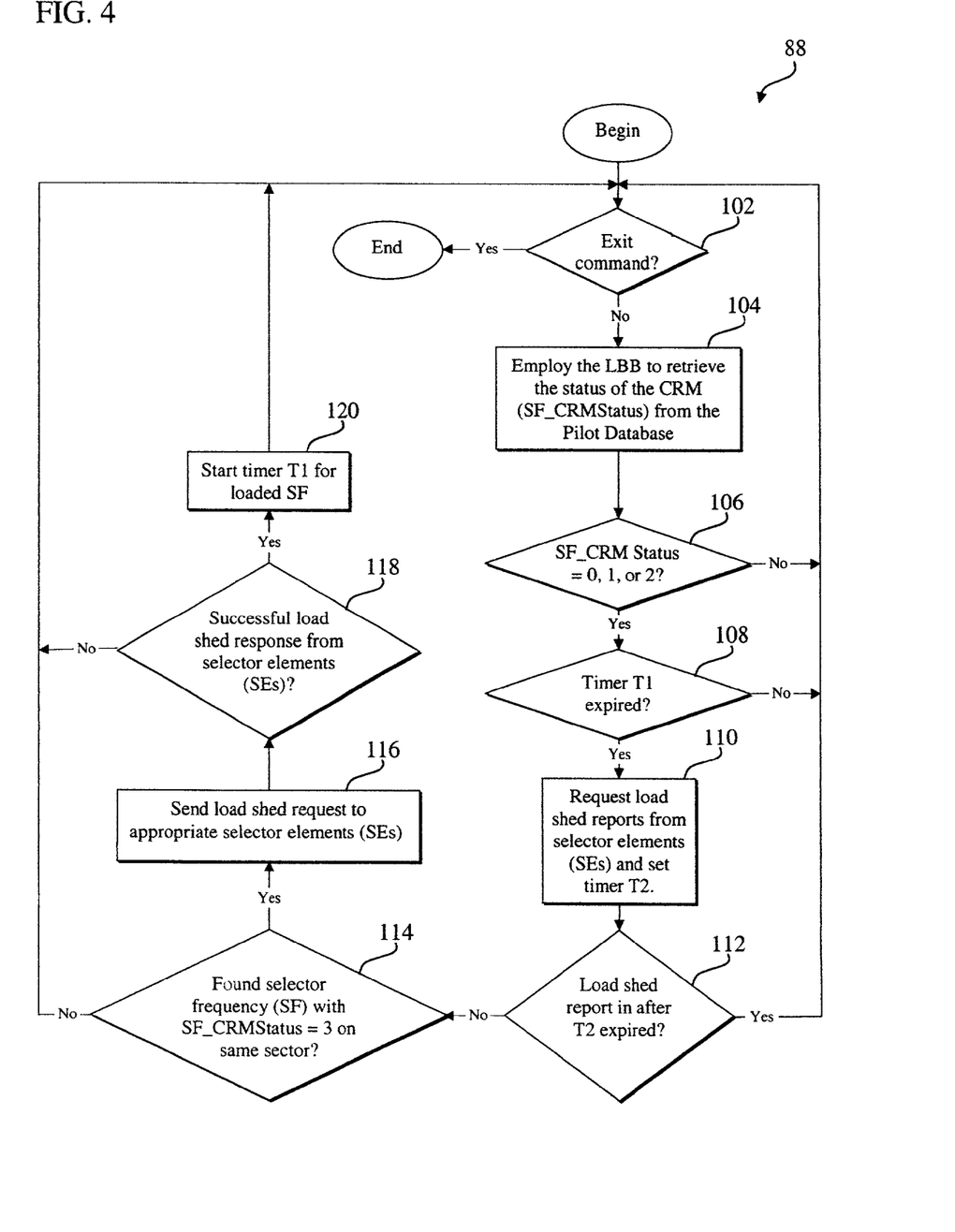
FIG. 4 is a flow diagram of software constructed in accordance with the teachings of the present invention running on the wireless communications system of FIG. 3 for facilitating load balancing across frequencies.

FIG. 4 is a flow diagram of the load shed routine 88 of FIG. 3 constructed in accordance with the teachings of the present invention for facilitating load balancing across frequencies.

With reference to FIGS. 3 and 4, in an initial exit-checking step 102, the software 88 checks to see if an exit command has been issued via an input device such as the BSM 70. If an exit command was issued, the software 10 ends. Otherwise, control is passed to a LLB retrieving step 104.

In the LLB retrieving step 104, the LLB 82 retrieves the status of frequencies controlled by the CRM 64 from the pilot database 84. Subsequently, control is passed to a status-checking step 106.

In the status-checking step 106, the software checks the status variables ( SF_CRMStatus) for frequencies in the pilot database 90 to see if any frequencies have a 0, 1, or 2 status, i.e., have a status not equal to 3. Frequencies with a status of 0, 1, or 2 are not completely available, which may be due to corresponding frequency resources dropping below predetermined resource thresholds. If none of the frequencies have a status of 0, 1, or 2, then control is passed back to the initial exit-checking step 102. Otherwise, control is passed to a first timer-checking step 108.

In the first timer-checking step 108, for a given sector frequency pair with status 0, 1 or 2, the software 88 checks its corresponding timer (T1), which is initialized to zero (i.e. timer expired) upon activation of the software 88. If T1 has not expired, control is passed back to the initial exit-checking step 102. Otherwise, control is passed to a report-requesting step 110.

The report-requesting step 110 requests load shed reports from SE's 86 associated with frequencies that have a status of 0, 1, or 2. A second timer (T2) is also set to zero and begins counting upon the request of load shed reports by the report-requesting step 110 running on the LLB 88. Control is then passed to a second timer-checking step 112.

The second timer-checking step 112 determines if the LLB 82 has received a corresponding report from the SE's 86 in response to the report request from the LLB 82 before the timer T2 has expired. If the load shed report was received by the LLB 82 after T2 expired, then control is passed back to the initial exit-checking step 102. Otherwise, control is passed to a frequency availability-checking step 114.

The frequency availability-checking step 114 searches the pilot database 84 for the presence of available frequencies, i.e., frequencies having an SF_CRMStatus of 3 on the same sector as the unavailable frequency or frequencies (SF_CRMStatus=0, 1, or 2). If an available frequency is not found, then control is passed back to the initial exit-checking step 102. Otherwise, control is passed to a load shed request step 116.

The load shed request step 116 sends a load shed request from the LLB 82 to the SE's 86 associated with frequencies having a status of 0, 1, or 2. The SE's 86 then initiate handoff of mobile stations operating on the frequency or frequencies having a status of 0, 1, or 2 to an available frequency or frequencies having a status of 3. The mobile stations to be handed off meet additional selection criteria, such as RTD's below a certain threshold, and single pilot signals in the corresponding active sets, as described above. The additional selection criteria are included in the load shed request message from the LLB 82. The SE's 86 attempt handoff, i.e., network load re-distribution or load balancing, and then report the results back to the LLB 82.

Subsequently, control is passed to a response-checking step 118. The response-checking step 118 determines if the LLB 82 received successful load shed response messages from selector elements that were issued the load shed request from the LLB 82 via the load shed request step 116. If no successful load shed responses were received by the LLB 82 from the appropriate SE's 86, then control is passed back to the initial exit-checking step 102. Otherwise, control is passed to a timer setting step 120 where timer T1 is set for the sector frequencies that received additional mobile stations. Timer T1 is set to avoid thrashing, which is an undesirable phenomena that occurs when too many mobile stations are switched to a new frequency back to back. The setting of timer T1 is discussed more fully below.

Additional functionality accompanying of the software 88 is spread across modules in the system 10, and includes software (such as the frequency status routine 92, the vertical neighbor record 90, and software running on the controller (not shown) of the selector elements 86 of FIG. 3) installed on different portions of the system 10. With access to the present teachings, those skilled in the art will know to build or obtain the additional software and how to distribute the additional software across modules of the system 10 of FIG. 3.

Only one load-balancing function exists (termed load-balancing broker (LLB)) for each SBS 76. The LBB 82 has access to the pilot database 84, where the SF_CRMStatus for each supported frequency of a given sector is dynamically updated from the corresponding SFC 62.

As described above, the LBB 82 monitors the status of each frequency of a sector. Upon detection of a frequency with a status not equal to 3, the LBB 82 queries all the SE's 86 for any mobile stations that meet the following criteria (load shedding criteria). The mobile station is serviced by the frequency (identified by the ExtendedBaseId) whose status is not equal to 3. The mobile station has a single pilot in the active set. The mobile station has an RTD less than a configurable threshold.

Any SE 86 handling a mobile station that meets the above criteria includes the international mobile station identity IMSI in the report to the LBB 82. Upon reception of the first report from one of the SE's 86, the LBB 82 checks for an available frequency (SF_CRMStatus=3) within the same sector, giving preference to the frequency with the worst FAV. If such a frequency is available, the LBB 82 sends a ShedLoadRequest message to the corresponding SE 86 asking the SE to move the mobile station to a different available frequency.

If no frequency with a status of 3 exists, then the LBB 82 starts the timer T1 for that sector frequency pair and move to the next sector frequency pair. The LBB 82 includes the IMSI of the mobile station to hard handoff and the new frequency to which to move the mobile station in the ShedLoadRequest.

Upon successful hard handoff of the mobile station, the SE 86 sends a ShedLoadResponse message to the LBB 82 indicating the success. The LBB 82 then sets the timer T1 for the new sector frequency pair (ExtendedBaseID) and does not initiate any load shedding from that frequency on that sector until the timer expires. The LBB 82 sets the timer T1 to A if the loaded frequency has a status of 2 and sets the timer T1 to B if the loaded frequency has a status of 1 or 0, where B is shorter than A.

If by the time the LoadShedRequest is received by the SE 86 from the LLB 82, the above load shedding criteria do not hold anymore, the SE 86 sends a LoadShedResponse with a failed status. When the hard handoff is not successful the LBB 82 records the failure, checks the status of the frequency, and starts the load shedding process again.

Implementation of load shedding in accordance with the teachings of the present invention minimizes handoff blocking probability, helps guarantee non-zero excess capacity for handoff on the best frequencies (with lowest FAV). The load shedding software 88 keeps the load on the best frequencies below a configurable threshold by moving mobile stations that are unlikely to get into handoffs (close to the center of the cell) to frequencies with higher FAV's.

When the load on a given frequency in a given sector exceeds a certain congestion threshold, the status of the frequency changes and is reflected in the pilot database 84 at the BSC 14. The LBB 82 then starts the load shedding procedure to bring the load down to an acceptable level. The LBB 82 controls the rate of hard handoffs through a timer $T_1$ which indicates the original load level on the congested frequency (SF_CRMStatus=2 or 1).

The LLB 82 sends a broadcast message RequestForLoadSheddingReport to all the SE's 86 indicating that a given frequency is to undergo load shedding. The broadcast message has the following form:

TABLE 1

| RequestForLoadSheddingReport | |
| --- | --- |
| Parameter Name | Type |
| ExtendedBasedId | MANDATORY |

When an SE 86 determines that the mobile station communicating with the SE 86 meets the load shedding criteria, it sends a LoadShedReport to the LBB 82, which has the following form:

TABLE 2

| LoadShedReport | |
| --- | --- |
| Parameter Name | Type |
| ExtendedBasedId | MANDATORY |
| SE_ID | MANDATORY |
| IMSI | MANDATORY |

After determining that there is a candidate frequency to move the mobile station to, the LBB 82 sends the following LoadShedRequest to the candidate SE:

TABLE 3

LoadShedRequest

| Parameter Name | Type |
| --- | --- |
| ExtendedBasedId | MANDATORY |
| SE_ID | MANDATORY |
| IMSI | MANDATORY |
| Target_ExtendedBaseId | MANDATORY |

After receiving the LoadShedRequest, the SE 86 first performs the hard handoff and then responds to the LBB 82 with a LoadShedResponse indicating the status of the handoff as indicated below:

TABLE 4

LoadShedResponse

| Parameter Name | Type |
| --- | --- |
| ExtendedBasedId | MANDATORY |
| SE_ID | MANDATORY |
| Status | MANDATORY |

The load shedding software 88 also operates in accordance with the following guidelines. Load shedding is allowed from frequencies with a given FAV to frequencies with higher FAV only. Load shedding is only allowed between frequencies of the same sector. Finally, when a mobile station is moving between two sectors, if possible, soft handoff must happen before a hard handoff for load shedding purposes between frequencies in the new sector is considered. Therefore, the SE's 86 give priority to soft handoffs when a load shed request and a soft handoff request are received simultaneously by the SE's 86.

Figure 5:
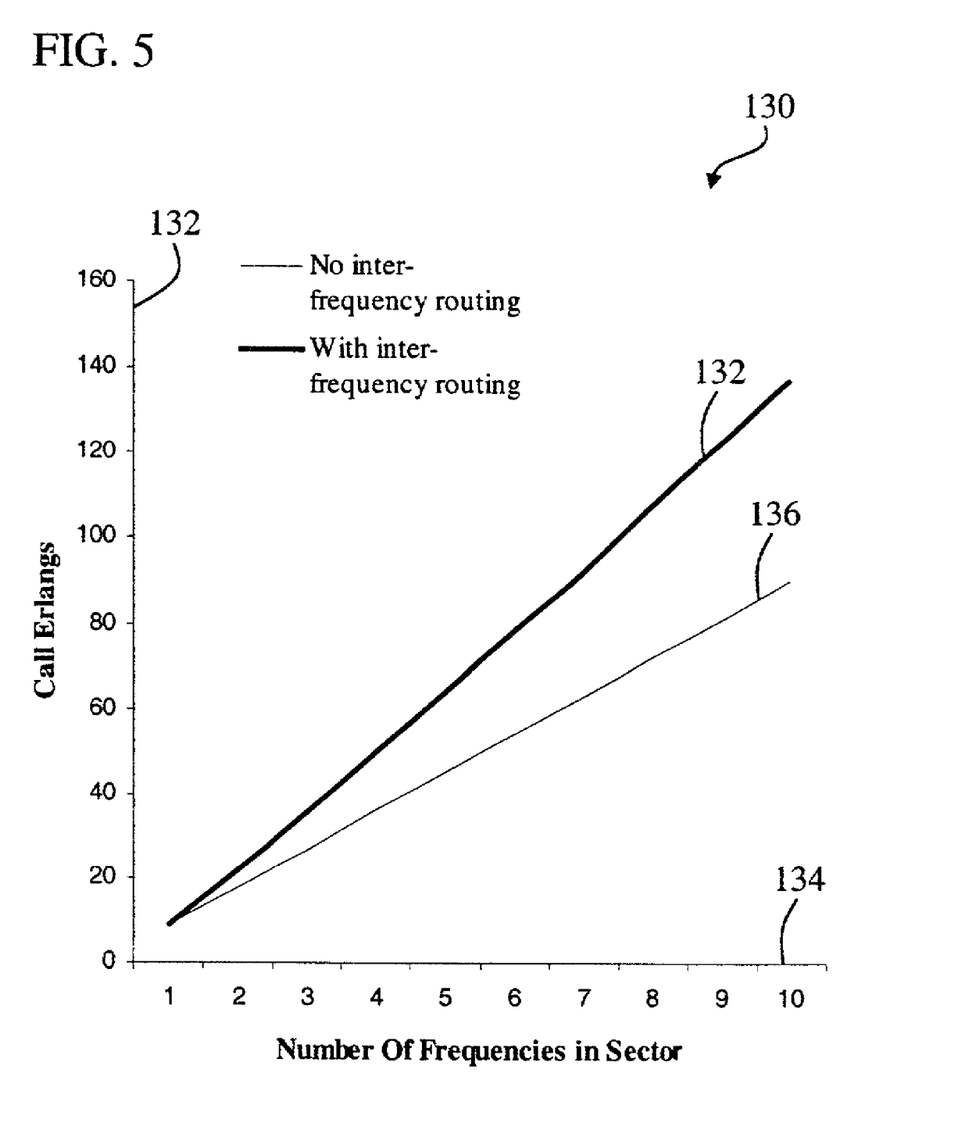
FIG. 5 is a graph of capacity versus frequencies supported for a given cell employing the load-balancing system of FIGS. 3 and 4 and for a cell not supporting load balancing.

FIG. 5 is a graph 130 of capacity versus frequencies supported for a given cell employing the load-balancing system of FIGS. 3 and 4 and for a cell not supporting load balancing. The graph 130 has a vertical axis 132 representing traffic in call erlangs and a horizontal axis 134 representing the number of frequencies in a given sector.

A first plot 136 represents traffic per number of frequencies that may be supported for a multi-frequency system not employing load balancing and a given hardware configuration and with call blocking and dropping probabilities maintained within acceptable limits. The first plot 136 increases linearly with the number of frequencies per sector.

A second plot 138 represents traffic per number of frequencies for a comparable multi-frequency system employing load balancing in accordance with the present invention. The second plot 138 suggests that a system employing load balancing in accordance with the present invention can support more traffic for the same hardware configuration while maintaining call blocking and dropping probabilities within acceptable limits. Hence, resource efficiency of a communications system may be enhanced by incorporating the load-balancing system of the present invention.

The gains result partially from the fact that air link resources are now available to all mobile stations on any of the sector frequencies. In addition, less hardware is required to meet the same blocking and dropping probabilities.

Thus, the present invention has been described herein with reference to a particular embodiment for a particular application. Those having ordinary skill in the art and access to the present teachings will recognize additional modifications, applications, and embodiments within the scope thereof. It is therefore intended by the appended claims to cover any and all such applications, modifications and embodiments within the scope of the present invention.

Accordingly,

What is claimed is:

1. A system for improving efficiency of a wireless communications network employing a plurality of frequencies per cell comprising:

first means for monitoring a network load associated with each of said plurality of frequencies and providing corresponding status values in response thereto;

second means for comparing said status values to a predetermined criterion and providing an indication in response thereto when one or more of said status values meet said criterion;

third means for redistributing said network load in accordance with said indication, the third means including determining which mobile stations are within an inner coverage area of a cell based on whether round trip delays (RTD) of the mobile stations are less than a threshold, and initiating handoff of at least one mobile station that meets a predetermined handoff criterion within the inner coverage area to a different frequency on the cell, wherein said predetermined handoff criterion comprises said at least one mobile station being serviced by a frequency with a predetermined status value, said at least one mobile station comprising a single pilot signal in an active set and said at least one mobile station comprising an RTD that is less than an RTD threshold; and fourth means for ranking said plurality of frequencies, wherein the ranking of a particular frequency is determined by the number of additional frequencies that overlap the particular frequency.

2. The system of claim 1 wherein said criterion includes one or more predetermined thresholds so that when one or more of said predetermined thresholds is surpassed by said one or more of said status values, said criterion is met.

3. The system of claim 2 wherein said status values are representative of loading conditions for communications system resources associated with each of said frequencies, said loading conditions representative of currently available resources allocated for each of said plurality of frequencies.

4. The system of claim 3 wherein each of said status values include a hardware resource component, an air link resource component, and a handling resource component, each component indicative of respective remaining resources.

5. The system of claim 4 wherein said hardware resource component incorporates the number of currently available channel elements for an associated frequency.

6. The system of claim 5 wherein said air link resource component incorporates transmit power available for a particular frequency before maximum air link capacity is reached.

7. The system of claim 6 wherein said handling resource component incorporates the number of available Walsh codes for a particular frequency.

8. The system of claim 4 wherein said first means includes sector frequency controllers, one for each of said plurality of frequencies in a given sector.

9. The system of claim 8 wherein each of said sector frequency controllers is in communication with a corresponding call resource manager.

10. The system of claim 9 wherein said call resource manager is positioned on a base station transceiver subsystem.

11. The system of claim 9 wherein said second means includes software running on each of said sector frequency controllers, said software for generating a status value associated with a corresponding frequency, comparing said status value to one of said predetermined thresholds, and generating a status message in response thereto.

12. The system of claim 11 wherein said status message specifies that said corresponding frequency is available; said corresponding frequency is available for handoff only; said corresponding frequency is available for emergency calls only; or said corresponding frequency is unavailable.

13. The system of claim 12 wherein said indication provided by said second means incorporates said status message when said status message specifies that said corresponding frequency is available for handoff only, for emergency calls only, or is otherwise unavailable.

14. The system of claim 13 wherein said third means includes a load-balancing broker that receives said indication, said load-balancing broker in communication with a pilot database and selector elements.

15. The system of claim 14 wherein said selector elements are positioned on a base station controller and are in communication with channel elements of a base station transceiver subsystem associated with said cell and said corresponding frequency.

16. The system of claim 14 wherein said load-balancing broker includes means for determining mobile stations not currently undergoing handoff, operating within the inner coverage area of the cell, and associated with frequencies indicated via said indication and issuing a load shed request to said selector elements in response thereto.

17. The system of claim 16 wherein said selector elements include means for implementing handoff of a mobile station from a first frequency to a target frequency in accordance with load balancing handoff criteria.

18. The system of claim 17 wherein said selector elements include means for providing a load shed response to said load-balancing broker in response to the receipt of said load shed request, said load shed response indicating if said mobile stations were successfully handed off to available frequencies specified in said load shed request via said means for implementing handoff.

19. The system of claim 18 wherein said load-balancing handoff criteria specify that handoff is only allowed from said first frequency to a target frequency having a higher frequency availability value than said first frequency and when said target frequency is within the same sector as said first frequency, said handoff criteria giving preference to target frequencies with higher frequency availability values.

20. The system of claim 18 wherein said means for determining includes a pilot database and said selector elements, said pilot database including a vertical neighbor record specifying overlying frequencies associated with each frequency.

21. The system of claim 16 wherein said at least one mobile station within the inner coverage area of the cell is less likely than other mobile stations in the cell to subsequently require handoff for load balancing purpose.

22. An efficient wireless communications system that accommodates a plurality of frequencies per cell comprising:
first means for establishing communications between a wireless communications device and a second communications device via allocation of communications system resources associated with a given frequency;
second means for monitoring said resources associated with said given frequency and providing a signal when said resources match a predetermined criterion;
third means for transferring said communications from said given frequency to a target frequency in response to said signal, the third means including determining whether the wireless communications device is within an inner coverage area of a cell based on whether round trip delay (RTD) of the wireless communications device is less than a threshold, and initiating handoff of the wireless communications device if it meets a predetermined handoff criterion to the target frequency, wherein said predetermined handoff criterion comprises said wireless communications device being serviced by a frequency with a predetermined status-_value, said wireless communications device comprising a single pilot signal in an active set and said wireless communications device comprising an RTD that is less than an RTD threshold; and
fourth means for ranking a plurality of frequencies, wherein the ranking of a particular frequency is determined by the number of additional frequencies that overlap the particular frequency.

23. The system of claim 22 wherein said second means includes a base station transceiver subsystem controller having a selector frequency controller and a call resource manager, said call resource manager in communication with channel elements on a base station transceiver subsystem associated with said given frequency.

24. The system of claim 23 wherein said second means includes a target base station transceiver subsystem controller having a target selector frequency controller and a target call resource manager, said target call resource manager in communication with target channel elements on a target base station transceiver subsystem associated with said target frequency.

25. The system of claim 24 wherein said third means includes a load-balancing broker in communication with a pilot database running on a selector element controller in communication with selector elements of a selector bank subsystem of a base station controller that controls said base station transceiver subsystem and said target base station transceiver subsystem, said base station controller in communication with a landline network via a mobile switching center.

26. The system of claim 25 wherein said mobile switching center includes a call control processor, a supplementary services adjunct, and a base station manager.

27. The system of claim 22 wherein said third means includes means for handing off said wireless communications device to the target frequency to facilitate load-balancing between frequencies, said wireless communications device less likely than other wireless communications devices communicating via said given frequency to subsequently require handoff for load balancing purpose.

28. The system of claim 27 wherein said predetermined criterion includes a round trip delay value less than a predetermined round trip delay threshold.

29. The system of claim 22 wherein said third means includes means for employing existing vertical neighbors and horizontal neighbors to said target frequency to select said target frequency so as to minimize instances of subsequent hard handoff.

30. The system of claim 29 wherein said means for employing includes generating a frequency availability value that is inversely related to the number of horizontal and vertical neighbors of said target frequency and selecting said target frequency to have a high frequency availability value.

31. A system for strategically distributing communications system resources in a wireless communications system comprising:
    first means for monitoring traffic in a cell of said wireless communications system, said cell associated with a plurality of frequencies, each frequency associated with a predetermined geographic region within said cell that may overlap one or more geographic regions within said cell;
    second means for monitoring system resources in said cell and providing a resource status indication in response thereto;
    third means for comparing said resource status indication to predetermined criteria and providing a load reassignment command in response thereto;
    fourth means for selectively reassigning network load among said plurality of frequencies in response to said load reassignment command to maintain said system resource status indication in concurrence with said criteria, the fourth means including determining which mobile stations are within an inner geographic region of the cell based on whether round trip delays (RTD) of the mobile stations are less than a threshold, and initiating handoff of at least one mobile station that meets a predetermined handoff criterion within the inner geographic region to a different frequency on the cell, wherein said predetermined handoff criterion comprises said at least one mobile station being serviced by a frequency with a predetermined status value, said at least one mobile station comprising a single pilot signal in an active set and said at least one mobile station comprising an RTD that is less than an RTD threshold; and
    fifth means for ranking said plurality of frequencies, wherein the ranking of a particular frequency is determined by the number of additional frequencies that overlap the particular frequency.

32. A method for improving the efficiency of a wireless communications network that has a cell that accommodates a plurality of frequencies comprising the steps of:
    monitoring network load associated with each of said plurality of frequencies and providing corresponding status values in response thereto;
    comparing said status values to predetermined thresholds and providing an indication in response thereto when one or more of said status values exceeds one or more of said predetermined thresholds;
    redistributing said network load in accordance with said indication, wherein redistributing said network load includes determining which mobile stations are within an inner coverage area of the cell based on whether round trip delays (RTD) of the mobile stations are less than a threshold, and initiating handoff of at least one mobile station that meets a predetermined handoff criterion within the inner coverage area to a different frequency on the cell, wherein said predetermined handoff criterion comprises said at least one mobile station being serviced by a frequency with a predetermined status value, said at least one mobile station comprising a single pilot signal in an active set and said at least one mobile station comprising an RTD that is less than an RTD threshold; and
    ranking said plurality of frequencies, wherein the ranking of a particular frequency is determined by the number of additional frequencies that overlap the particular frequency.

* * * * *